United States Patent
Marshall

(10) Patent No.: US 7,065,329 B2
(45) Date of Patent: Jun. 20, 2006

(54) HALF DUPLEX RADIO TRANSCEIVER WITH LOW IF RECEIVER

(75) Inventor: Christopher B. Marshall, Haywards Heath (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 459 days.

(21) Appl. No.: 10/095,870

(22) Filed: Mar. 12, 2002

(65) Prior Publication Data
US 2002/0132590 A1 Sep. 19, 2002

(30) Foreign Application Priority Data
Mar. 17, 2001 (GB) ................... 0106696.8

(51) Int. Cl.
H04B 1/38 (2006.01)
H04B 1/40 (2006.01)
H04B 1/26 (2006.01)

(52) U.S. Cl. .................. 455/86; 455/73; 455/76; 455/78; 455/83; 455/85; 455/317; 455/318; 455/324; 455/303

(58) Field of Classification Search ............ 455/73, 455/76, 78, 83, 85, 86, 317, 318; 433/324, 433/303
See application file for complete search history.

(56) References Cited

U.S. PATENT DOCUMENTS

| 5,862,181 A * | 1/1999 | Ishizuka .................. 375/259 |
| 6,148,181 A * | 11/2000 | Otaka ..................... 455/86 |
| 6,324,385 B1 * | 11/2001 | Nagano et al. ............ 455/76 |
| 6,339,711 B1 * | 1/2002 | Otaka et al. ............ 455/550.1 |
| 6,427,068 B1 * | 7/2002 | Suominen ................ 455/317 |
| 6,577,855 B1 * | 6/2003 | Moore et al. ............. 455/324 |
| 6,717,981 B1 * | 4/2004 | Mohindra ................. 375/219 |
| 2004/0009752 A1 * | 1/2004 | Mohan ................... 455/78 |

FOREIGN PATENT DOCUMENTS

| EP | 1104953 A1 | 11/1999 |
| GB | 2305037 A | 9/1995 |
| WO | WO9843364 | 3/1998 |
| WO | WO0011794 | 8/1999 |

OTHER PUBLICATIONS

"CMOS Wireless Transceiver Design" by Jan Crols and Michiel Steyaert, published by Kluwer Academic Publishers, 1997, p. 26 and pp. 55–61.

* cited by examiner

Primary Examiner—Lee Nguyen
Assistant Examiner—Wen W. Huang

(57) ABSTRACT

A half duplex radio transceiver comprises a transmitter (100) and a low IF receiver (200). The difference between the transmit frequency and the receive frequency is equal to the low IF. A common frequency generator (300) is shared between the transmitter and receiver without needing to be retuned. An upconversion signal at the transmit frequency is used for down conversion in the receiver. Transceivers at opposite ends of a communication link, such as in a master/slave network, have their transmit and receive frequencies interchanged. Optionally a transceiver may be configurable to either form e.g. as either a master of a slave station. Channel sensing for Carrier Sense Multiple Access (CSMA) may be performed on the transmit frequency without retuning the receiver.

8 Claims, 7 Drawing Sheets

HALF DUPLEX RADIO TRANSCEIVER WITH LOW IF RECEIVER

The invention relates to a radio transceiver suitable for use in, for example, unlicensed frequency bands, a radio system comprising the transceiver, and an integrated circuit embodying a radio transceiver.

Radio transceivers generally fall into one of two categories.

Figure 6:
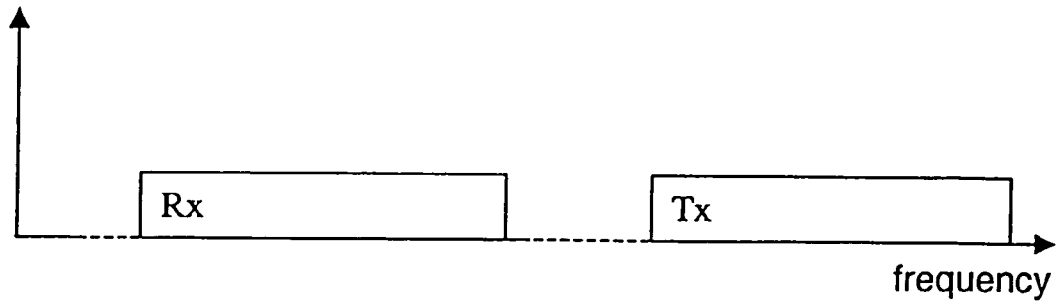

In the first category, the transceivers have a substantial frequency separation between transmit and receive frequencies. Using conventional terminology, a channel comprises a pair of frequencies; a transmit frequency and a receive frequency. A frequency band plan for such a transceiver is illustrated in FIG. 6 in which the separate frequency bands labelled Rx and Tx each contain many channel frequencies. The separation between transmit and receive frequencies can enable such a transceiver to transmit and receive simultaneously by reducing interference between transmitted and received signals. An example of such a transceiver can be found in a GSM base station. Such a transceiver may also be found in equipment that does not transmit and receive simultaneously if, for example, the equipment communicates with a base station that does. Examples of this type of equipment can be found in analogue Private Mobile Radio systems.

Transceivers in this first category may be implemented in two basic forms, first with the transmit frequency higher than the receive frequency, as illustrated in FIG. 6, and second with the transmit and receive frequencies interchanged. A transceiver of the first basic form can communicate with a transceiver of the second basic form, and vice versa. The two basic forms may represent, for example, a base station and a mobile station, or a master station and a slave station.

Figure 7:
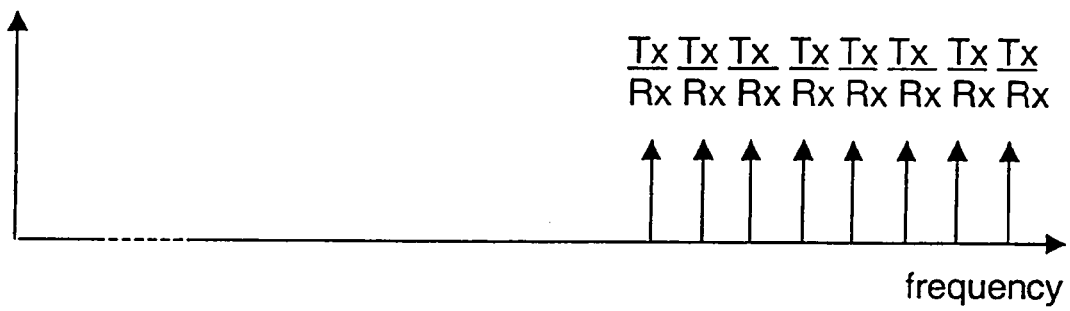

In the second category, the transceivers have no separation between transmit and receive frequencies, but transmit and receive on the same nominal frequency. (The term nominal is included to encompass the situation where a slight frequency difference may be introduced by, for example, automatic frequency control in the receiver). In this case a channel comprises a single frequency. A frequency band plan for such a transceiver is illustrated in FIG. 7 in which each frequency is labelled as both Rx and Tx. In such transceivers, communication takes place in half duplex, or full duplex communication can be achieved by using time division duplex operation. An example of such a transceiver can be found in a DECT cordless telephone handset.

In order to achieve an efficient use of radio spectrum, a desirable property for a radio transceiver that does not transmit and receive simultaneously is a fast switching time between the transmit and receive states. While a transceiver is switching it is unable to transmit or receive. Furthermore, if Carrier Sense Multiple Access (CSMA) is employed, the switching period influences the likelihood of interference between different transceivers, and the switching period is particularly important if transmissions are of a short duration. The switching time is becoming an increasingly important design consideration as faster data transmission speeds are employed. Switching between transmit and receive states is conventionally done by stepping the frequency of a synthesiser, which requires time to lock and settle. Fast locking and settling can be achieved only at the expense of degraded noise performance of the synthesiser.

In order to reduce the cost of a radio transceiver, architectures that are amenable to a high level of circuit integration are desirable. A known architecture suitable for an integrated radio receiver is the low IF architecture employing a polyphase channel filter. The low IF is typically up to two times the signal bandwidth or channel spacing. A known architecture for an integrated radio transmitter is direct upconversion. Both the low IF architecture and direct upconversion are described in "CMOS Wireless Transceiver Design" by Jan Crols and Michiel Steyaert, published by Kluwer Academic Publishers, 1997, page 26 and pages 55–61.

Furthermore, in order to achieve a high level of integration, thereby reducing product cost, it is desirable to share some components between the transmitter and receiver, for example sharing frequency generators.

An object of the present invention is to provide a radio transceiver, and an integrated circuit embodying a radio transceiver, having reduced complexity and cost and a fast switching time between receive and transmit states, and a radio system having improved efficiency.

According to the present invention there is provided a radio transceiver comprising a transmitter adapted to transmit on a transmit frequency, a receiver adapted to receive on a first receive frequency, and frequency generation means for generating a signal at the transmit frequency, wherein the receiver comprises a direct conversion low IF receiver, wherein the difference between the transmit frequency and the first receive frequency is equal to the low IF, wherein the signal at the transmit frequency is used to down convert a received signal, and wherein the transceiver can switch between a receive state and a transmit state without the nominal frequency of the frequency generation means being altered.

The invention is based on the realisation that whereas the separation between transmit and receive frequencies is generally predetermined by standards, in some radio systems there is freedom to select a novel spacing between transmit and receive frequencies.

The invention is further based on the realisation that, even where a transceiver is not required to transmit and receive simultaneously, or is not required to communicate with a transceiver that does, benefits can be derived by employing a separate transmit and receive frequency.

The invention is further based on the realisation that, by selecting the spacing between the transmit and receive frequency to be equal to the low IF, a signal at the transmit frequency can be used directly as a down conversion signal.

The invention is further based on the realisation that it is possible to perform channel sensing on a transmit frequency without switching the receiver to the transmit frequency.

The invention is further based on the realisation that it is possible to perform channel sensing on a transmit frequency simultaneously to receiving on a receive frequency.

The invention enables a high level of circuit integration and provides for sharing of components between a transmitter and receiver, thereby providing a transceiver having reduced complexity and cost.

The invention enables fast switching between receive and transmit states as there is no need to alter the frequency of the frequency generation means when switching between states.

There are two basic variants of transceiver embodying the invention; the first variant, in which the transmit frequency is higher than the receive frequency, and the second variant, in which the transmit and receive frequencies are interchanged such that the transmit frequency is lower than the receive frequency.

A dual variant transceiver embodying the invention may also be implemented, in which the transceiver can be configured as one of either basic variant, or in which the transmit frequency and the receive frequency are interchangeable thereby enabling a dual mode transceiver which can be switched between the two basic variants.

In a radio system, a transceiver operating as one basic variant can communicate with a transceiver operating as the other basic variant. As an example, one variant may be a base station and the other variant a portable equipment, or one variant may be a master station and the other variant a slave station. As another example, all transceivers in a radio system may operate as one basic variant while receiving, or waiting to receive, a call, and adopt the other basic variant when initiating a call.

In a further embodiment of the invention the receiver is equipped with channel sensing means for sensing the presence of a radio signal near the transmit frequency while in the receive state, that is without retuning the receiver to the transmit frequency, by detecting received energy near zero Hertz after down conversion. Such an embodiment can improve the efficiency of a radio system where, prior to transmitting, a transceiver monitors the channel on which it transmits and defers transmission if the channel is occupied. In this way the likelihood of interference to or by the transmission may be reduced. By avoiding the step of retuning the receiver to the transmit frequency a fast changeover from receiving to transmitting is possible. Furthermore, the channel sensing can be performed simultaneously to receiving a wanted signal.

In a yet further embodiment of the invention the receiver is equipped to receive simultaneously on two receive frequencies, wherein the difference between the transmit frequency and each receive frequency is equal to the low IF. In this case the two receive frequencies are located one on each side of the transmit frequency. This embodiment can be used, for example, to increase the capacity of a transceiver to receive information, or to improve the ability for a transceiver to monitor system activity which can lead to improved system efficiency.

Figure 1:
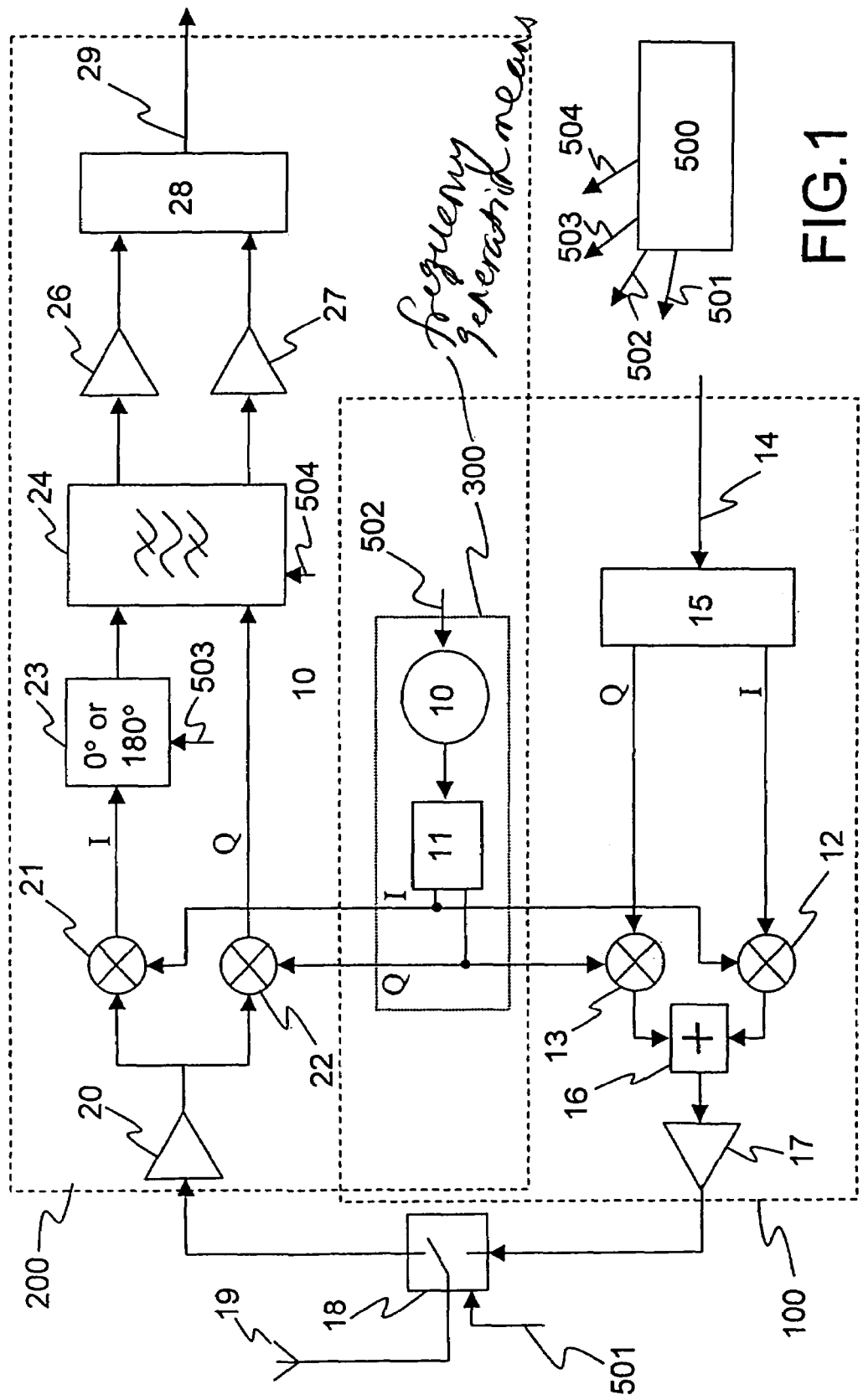
Figure 2:
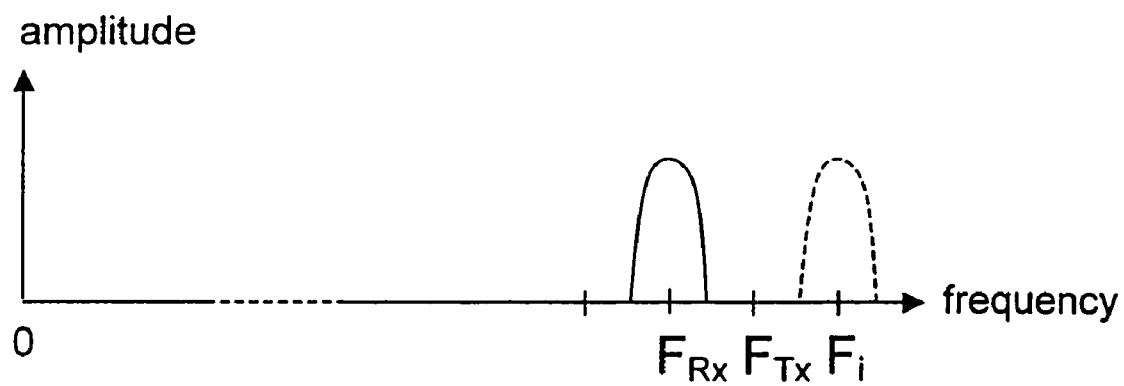
Figure 3:
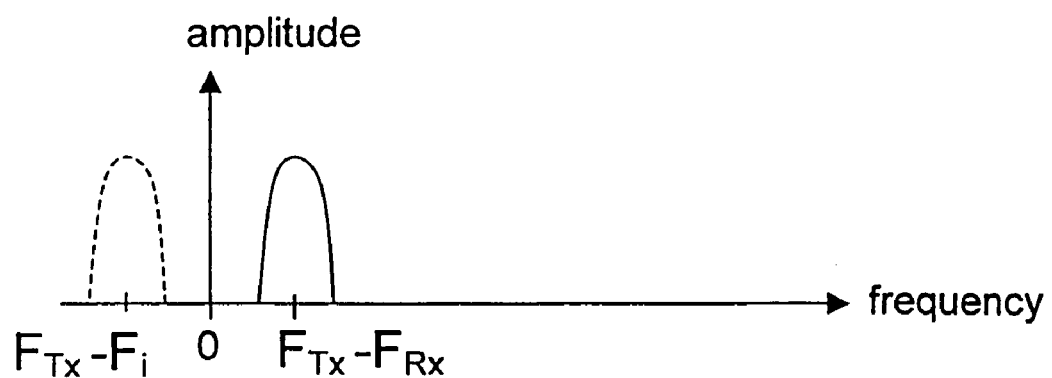
Figure 4:
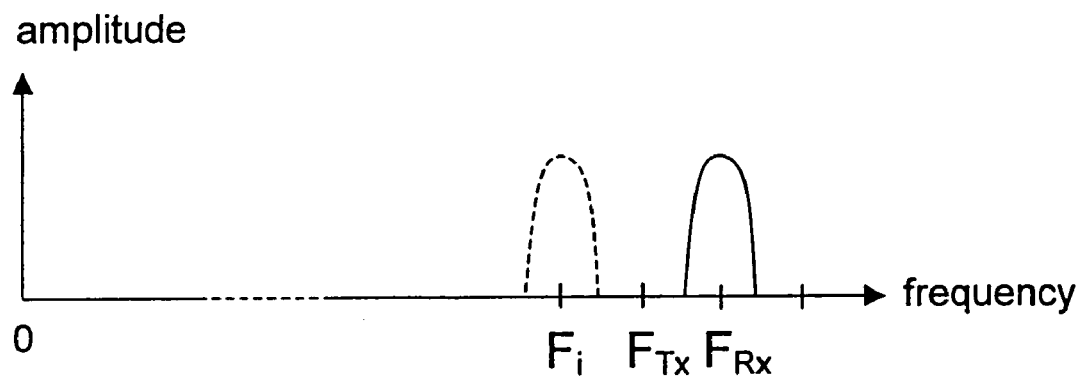
Figure 5:
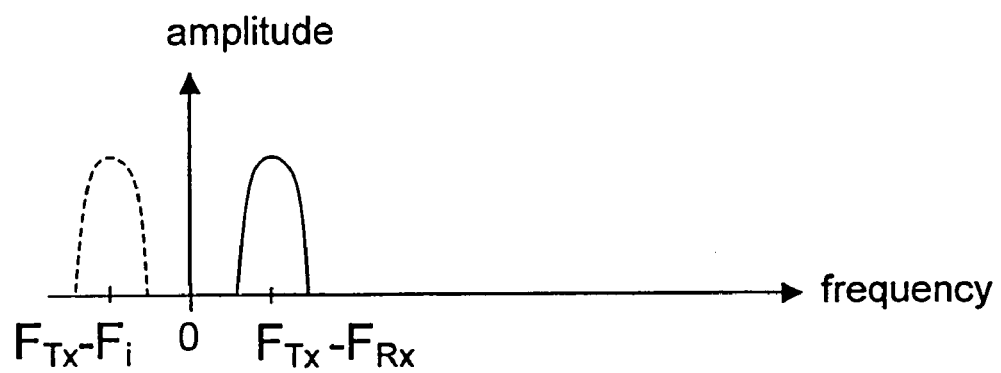
Figure 8:
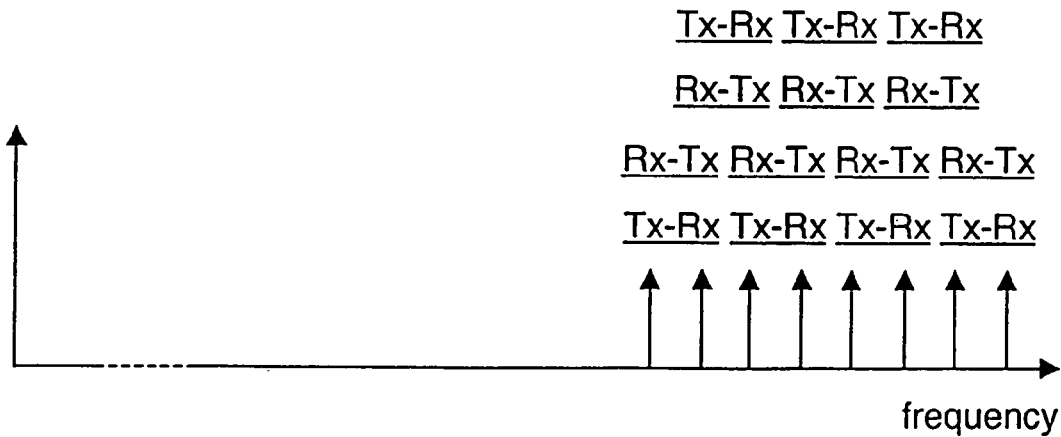
Figure 9:
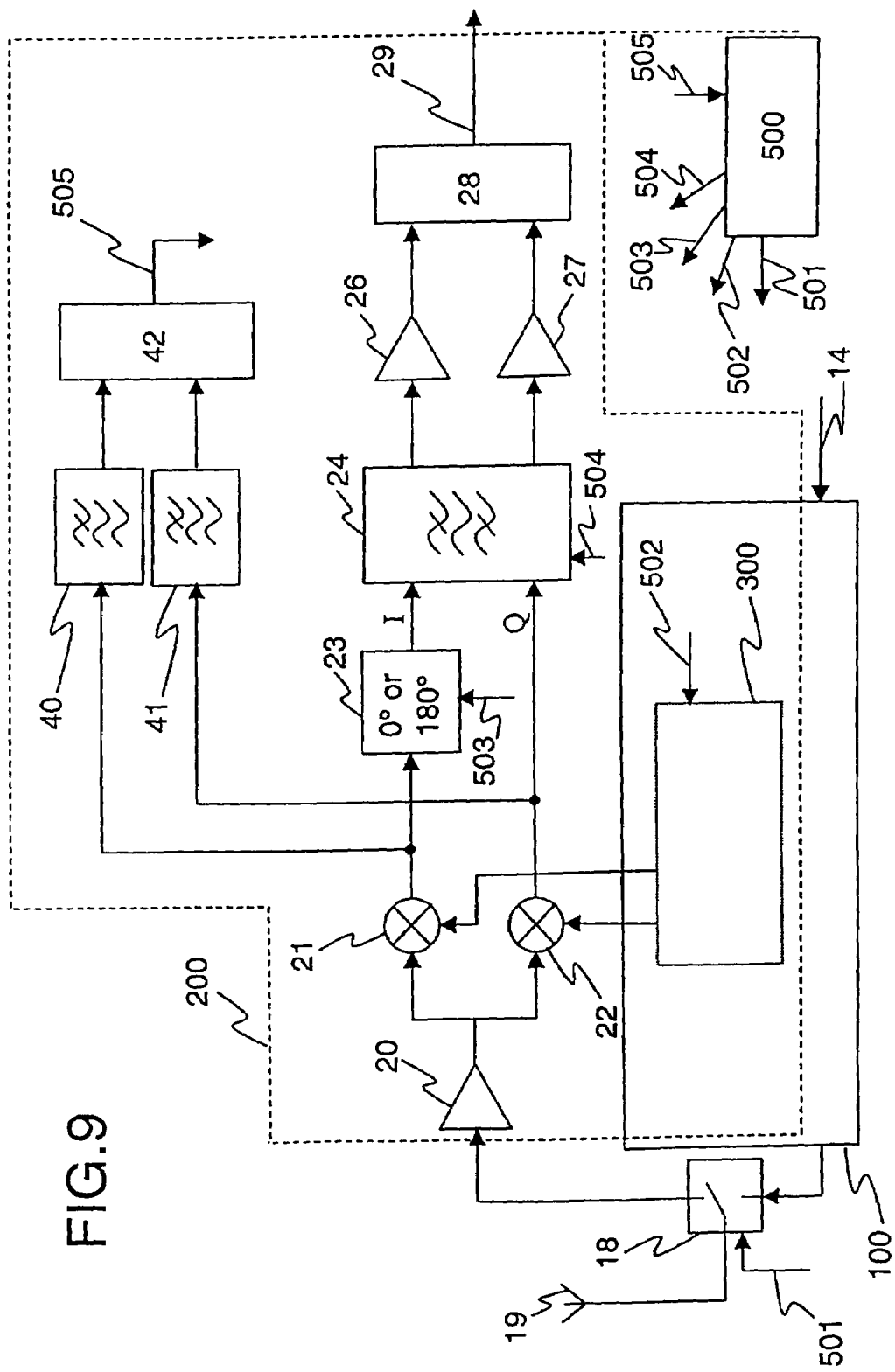
Figure 10:
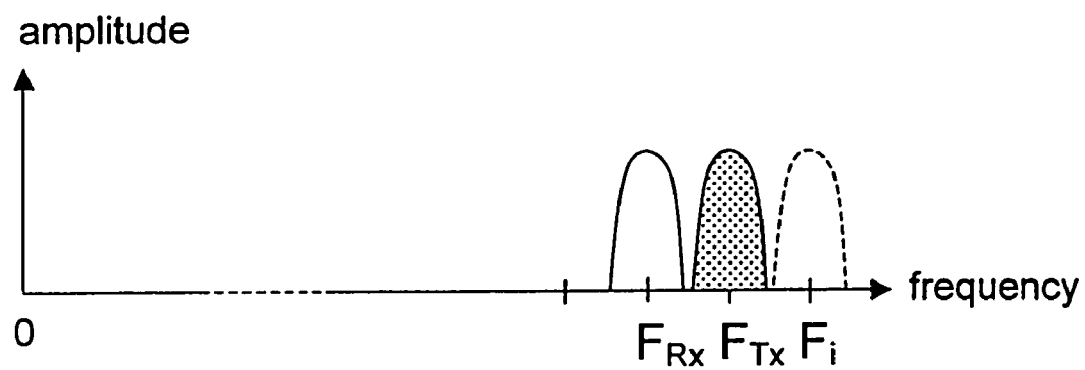
Figure 11:
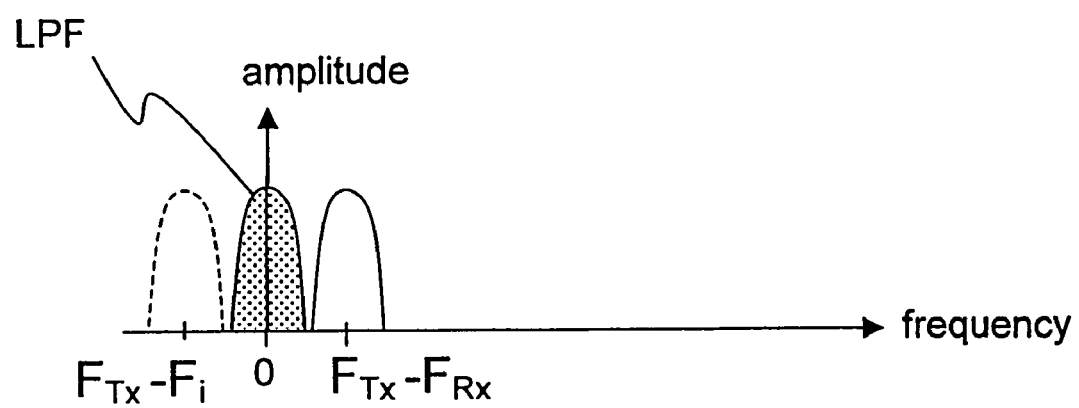
Figure 12:
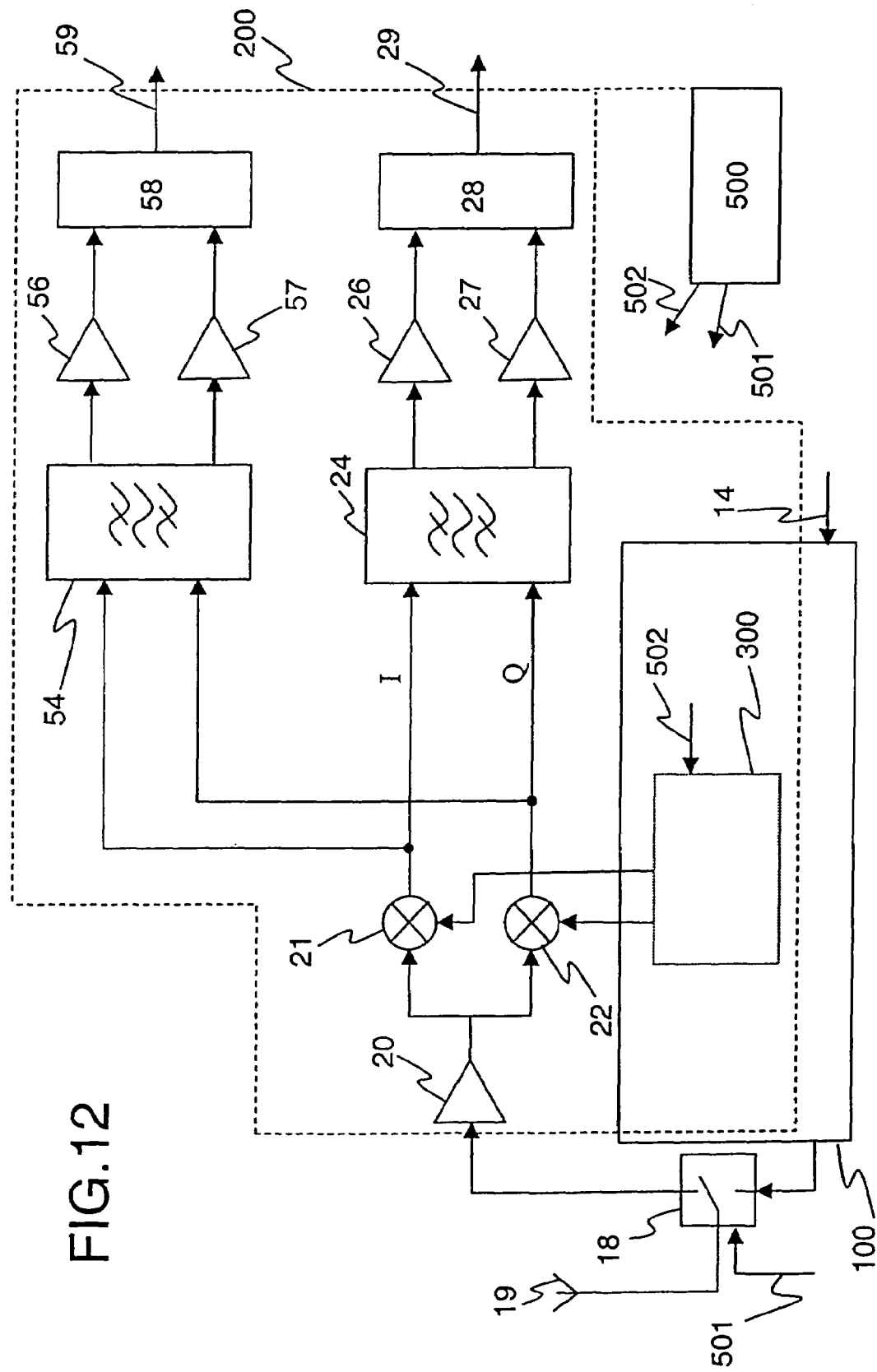

The invention will now be described, by way of examples, with reference to the accompanying drawings wherein;

FIG. 1 is a block schematic diagram of one embodiment of a transceiver made in accordance with the invention, FIGS. 2 and 3 illustrate the spectrum in a transceiver before and after down conversion respectively according to the invention, FIGS. 4 and 5 illustrate the spectrum in a transceiver before and after down conversion respectively when the transmit and receiver frequencies are interchanged according to the invention, FIG. 6 illustrates a conventional channel plan having separate transmit and receive frequency bands, FIG. 7 illustrates a conventional channel plan for transceivers that transmit and receive on a common frequency, FIG. 8 illustrates a channel plan for a frequency band in which the invention is used, FIG. 9 is a block schematic diagram of an embodiment of the invention incorporating channel sensing, FIGS. 10 and 11 illustrate the spectrum in a transceiver incorporating channel sensing according to the invention, and FIG. 12 is a block schematic diagram of an embodiment of the invention capable of receiving on two frequencies simultaneously.

Referring to FIG. 1 there is an antenna 19 coupled to a selection means 18. The selection means 18 is operable by a control means 500 acting on a selection means control input 501 to couple the antenna 19 to either a transmitter portion 100 of the transceiver via a first port when transmitting or to a receiver portion 200 of the transceiver via a second port when receiving.

The architecture of the transmitter portion 100 of the transceiver will be described first, followed by a description of the receiver portion 200.

In the transmitter portion 100, an information signal for transmission is supplied to a processing means 15 by means of an information input 14. The processing means 15 generates in-phase (I) and quadrature (Q) components of the information signal and these components are delivered to, respectively, a first input of a first mixer 12 and a first input of a second mixer 13.

A frequency generation means 300 comprises an oscillator 10 (which may for example comprise a frequency synthesiser) coupled to a phase shift means 11 which generates an in-phase component (I), and a quadrature component (Q), of an upconversion signal at a transmit frequency and these components are delivered to, respectively, a second input of the first mixer 12 and a second input of the second mixer 13.

An output from the first mixer 12 and an output from the second mixer 13 are coupled to first and second inputs of a summing stage 16 and an output from the summing stage 16 is coupled to a power amplifier 17. An output from the power amplifier 17 is coupled to the first port of the selection means 18 thereby coupling the selection means 18 and antenna 19 to the transmitter portion 100 of the transceiver.

The transmitter portion 100 described above comprises a direct upconversion architecture.

The second port of the selection means 18 is coupled to an input of a low noise amplifier 20 thereby coupling the selection means 18 and antenna 19 to the receiver portion 200 of the transceiver. An output from the low noise amplifier 20 is coupled to the first input of a third mixer 21 and the first input of a fourth mixer 22.

The in-phase and quadrature components of the upconversion signal at the transmit frequency generated by the frequency generation means 300 are delivered respectively to a second input of the third mixer 21 and a second input of the fourth mixer 22.

An output from the third mixer 21 is coupled via a switchable inverter 23 to a first input of a first polyphase filter 24. The switchable inverter 23 is operable to invert or not invert signals passing through it by means of the control means 500 acting on a control input 503. A first output from the first polyphase filter 24 is coupled via a first amplifier 26 to a first input of a first demodulator 28.

An output from the fourth mixer 22 is coupled to a second input of the first polyphase filter 24. A second output from the first polyphase filter 24 is coupled via a second amplifier 27 to a second input of the first demodulator 28. The first demodulator 28 delivers a demodulated information signal on an output 29.

The frequency generation means 300 is shared by the transmitter portion 100 and receiver portion 200 of the transceiver. The frequency generation means 300 has a frequency selection control input 502 operable by the control means 500.

The receiver portion 200 described above, apart from the switchable inverter 23, comprises a conventional low IF architecture in which a low IF receiver channel filter is realised by the first polyphase filter 24. The switchable inverter 23 is provided for the dual variant transceiver embodiment of the invention in which it is possible to switch between the first and second basic variants. A dual variant transceiver may operate in accordance with the first basic variant by setting the switchable inverter 23 to pass signals without inverting, and may operate in accordance with the second basic variant by setting the switchable inverter 23 to invert signals. A single variant transceiver may operate in accordance with the first basic variant by omitting the switchable inverter 23, or may operate in accordance with the second basic variant by using a non-switchable inverter instead of the switchable inverter 23. FIG. 2 illustrates a spectrum for the first basic variant where the transmit frequency is higher than the receive frequency. Referring to FIG. 2 there is illustrated three frequencies and two signals; a transmit frequency $F_{Tx}$, a wanted signal on a receive frequency $F_{Rx}$, and an unwanted signal on an image frequency $F_i$. The signals after down conversion in the receiver portion 200 will be at the difference frequencies as illustrated in FIG. 3, with the wanted signal at an IF of $F_{Tx}-F_{Rx}$ and the unwanted signal at an IF of $F_{Tx}-F_i$. The first polyphase filter 24 removes the unwanted signal and delivers the wanted signal at its outputs for demodulation. Signals at the sum frequencies after down conversion are filtered out by non-illustrated low pass filters or by the first polyphase filter 24.

FIG. 4 illustrates a spectrum for the second basic variant of the invention where the transmit and receive frequencies are interchanged such that the transmit frequency is higher than the receive frequency. Referring to FIG. 4 there is illustrated three frequencies and two signals; a transmit frequency $F_{Tx}$, a wanted signal on a receive frequency $F_{Rx}$, and an unwanted signal on an image frequency $F_i$. The signals after down conversion in the receiver portion 200 will be at the difference frequencies as illustrated in FIG. 5, with the wanted signal at an IF of $F_{Tx}-F_{Rx}$ and the unwanted signal at an IF of $F_{Tx}-F_i$. Without the inversion provided by the switchable inverter 23, the frequencies of the wanted and unwanted signals would have been interchanged. The first polyphase filter 24 removes the unwanted signal and delivers the wanted signal at its outputs for demodulation.

While a transceiver is operating as either a first or second basic variant, the oscillator 10 remains on a constant frequency and does not need to be switched when the transceiver changes between transmit and receive states. This enables a fast changeover time between transmit and receive states.

When a dual variant transceiver switches between the first and second basic variants, the oscillator 10 will be switched to the new transmit frequency by operation on the frequency selection control input 502.

FIG. 8 illustrates a channel plan for a frequency band in which transceivers operate in accordance with the invention. Transmit and receive frequencies alternate across the band and each channel comprises an adjacent pair of transmit and receive frequencies. There are two ways in which frequencies may be paired, and two variants (transmit higher or lower), resulting in four configurations of the frequencies. Any or all of the configurations may be employed in a band.

A transceiver in accordance with the invention may be designed to operate on a single channel (i.e. a pair of frequencies), or may be equipped to switch between one of a plurality of channels. For example, in the embodiment illustrated in FIG. 1, a channel may be selected by operation on the frequency selection control input 502.

The spacing between transmit and receive frequencies may be selected such that there is substantially no overlap between signals transmitted by separate transceivers transmitting on adjacent frequencies, or may be selected such that there is partial overlap.

In a further embodiment of the invention channel sensing means is incorporated for detecting potential interference to or by a transmission from the transceiver. Referring to FIG. 9, the outputs from the third and fourth mixers 21, 22 (I and Q components) are coupled to respective inputs of first and second low pass filters 40, 41. An output from each of the first and second low pass filters 40, 41 is coupled to a signal level detection means 42, and an output 505 from the signal level detection means 42 provides an indication to the control means 500 of whether received signal energy has been detected near the frequency on which the transceiver transmits and which may interfere with a transmission from the transceiver. When the transceiver is used in a CSMA system, this indication is used by the control means 500 to determine whether the transceiver should transmit immediately or defer transmission to avoid clashing with signals transmitted by other transmitters.

FIG. 10 illustrates the spectrum of potential interference centred on the transmit frequency $F_{TX}$. After down conversion the potential interference is centred on zero Hertz as illustrated in FIG. 11 and is selected by means of the first and second low pass filters 40, 41 for processing by the signal level detection means 42. The first and second low pass filters 40, 41 filter out the wanted signal on the receive frequency $F_{RX}$ and the unwanted signal on the image frequency $F_i$. The low IF receiver may include DC coupling which will create a notch in the spectrum of the interfering signal at zero Hertz, but this need not prevent channel sensing if the notch is narrower than the potential interfering signal.

In a further embodiment of the invention the transceiver is equipped to receive simultaneously on two receive frequencies located one each side of the transmit frequency by a spacing equal to the low IF. Referring to FIG. 12, the outputs from the third and fourth mixers 21, 22 (I and Q components) are coupled to respective first and second inputs of a second polyphase filter 54. The second polyphase filter 54 is adapted to select a wanted signal on the image frequency $F_i$. First and second outputs from the second polyphase filter 54 are coupled via respectively third and fourth amplifiers 56, 57 to respectively first and second inputs of a second demodulator 58. The second demodulator 58 delivers a demodulated signal on an output 59.

In a further embodiment of the invention the transceiver is equipped to receive simultaneously on two receive frequencies as described above, and also equipped to perform channel sensing for potential interference near the transmit frequency as described above.

Optionally, instead of the information signal being supplied to the processing means 15, it may alternatively be applied to modulate directly the oscillator 10, in which case the processing means 15 and the first and second mixer 12,13 may be omitted.

Optionally, the filtering provided by the first and second low pass filters 40, 41 may alternatively be provided by the low IF receiver channel filter, which in the embodiments described is realised by the first polyphase filter 24. In this case the first polyphase filter 24 is reconfigurable to select either the wanted signal or the potential interference signal by operation of the control means 500 on polyphase filter control input 504. Also in this case the signal level detection performed by the signal level detection means 42 may alternatively be performed by the first demodulator 28.

Optionally the channel sensing may be performed on only the I or Q component.

Optionally, alternative filtering means and alternative filter characteristics may be used to select a desired portion of spectrum for channel sensing.

Optionally, a dual variant transceiver may be switched between the first and second basic variants by interchanging the I and Q paths coupled to the first polyphase filter 24, as an alternative to employing a switchable inverter 23. This interchanging may be performed within the first polyphase filter 24 by operation of the control means 500 on polyphase filter control input 504.

Optionally, separate transmit and receive antennas may be employed, in which case selection means 18 is not required.

Optionally, instead of using a non-switchable inverter in a single variant transceiver operating in accordance with the second basic variant, as described above, the I and Q paths coupled to the first and second inputs of the first polyphase filter 24 may be interchanged prior to coupling to the first polyphase filter 24 or this interchanging may be performed within the first polyphase filter 24 by operation of the control means 500 on polyphase filter control input 504.

In implementation circuits employing differential signal paths, rather than single-ended signal paths, inversion of a signal may be achieved by interchanging the differential signal paths.

Optionally, alternative methods of applying modulation in the transceiver may be used.

The invention claimed is:

1. A radio transceiver comprising a transmitter adapted to transmit on a transmit frequency, a receiver adapted to receive on a first receive frequency, and a single frequency generation means for generating a signal at the transmit frequency;
   a switchable inverter operable to invert or not invert signals, the switchable inverter being adapted to output a first mode in which the transmit frequency is higher than the first receive frequency, a second mode in which the transmit frequency is lower than the first receive frequency, wherein the single frequency generating means comprises a single oscillator, wherein the receiver comprises a direct conversion low IF receiver, wherein the difference between the transmit frequency and the first receive frequency is equal to the low IF, wherein the signal at the transmit frequency is used to down convert a received signal, and wherein the transceiver can switch between a receive state and a transmit state without a nominal frequency of the single frequency generation means being altered.

2. A transceiver as claimed in claim 1, wherein the receiver is adapted to receive simultaneously on the first receive frequency and on a second receive frequency, wherein the difference between the transmit frequency and the second receive frequency is equal to the low IF.

3. A radio transceiver, comprising:
   a transmitter adapted to transmit on a transmit frequency;
   a receiver adapted to receive on a first receive frequency, the receiver comprising a direct conversion low IF receiver;
   a single frequency generation means for generating a signal at the transmit frequency;
   channel sensing means for sensing the presence of a radio signal near the transmit frequency while in a receive state; and
   a switchable inverter operable to invert or not invert signals, the switchable inverter being adapted to output a first mode in which the transmit frequency is higher than the first receive frequency, a second mode in which the transmit frequency is lower than the first receive frequency, wherein a difference between the transmit frequency and the first receive frequency is equal to the low IF, and the signal at the transmit frequency is used to down convert a received signal; and wherein the transceiver is adapted to switch between a receive state and a transmit state without the nominal frequency of the single frequency generation means being altered.

4. A transceiver as claimed in claim 3, wherein the channel sensing means comprises filtering means and signal level detection means.

5. A transceiver as claimed in claim 4, wherein the filtering means comprises a reconfigurable low IF receiver channel filter.

6. A transceiver as claimed in claim 3, wherein the receiver is adapted to receive simultaneously on the first receive frequency and on a second receive frequency, wherein the difference between the transmit frequency and the second receive frequency is equal to the low IF.

7. A radio transceiver, comprising:
   a transmitter adapted to transmit on a transmit frequency;
   a receiver adapted to receive on a first receive frequency, the receiver comprising a direct Conversion low IF receiver;
   a single oscillator adapted to generate a signal at the transmit frequency; and
   a switchable inverter operable to invert or not invert signals, the switchable inverter being adapted to output a first mode in which the transmit frequency is higher than the first receive frequency, a second mode in which the transmit frequency is lower than the first receive frequency, wherein: a difference between the transmit frequency and the first receive frequency is equal to the low IF; the signal at the transmit frequency is used to down convert a received signal; and the transceiver is adapted to switch between a receive state and a transmit state without a nominal frequency of the single oscillator being altered.

8. A transceiver as claimed in claim 7, wherein the receiver is adapted to receive simultaneously on the first receive frequency and on a second receive frequency, wherein the difference between the transmit frequency and the second receive frequency is equal to the low IF.

* * * * *